(12) United States Patent
Kingsborough et al.

(10) Patent No.: US 7,753,262 B2
(45) Date of Patent: Jul. 13, 2010

(54) TRANSACTION CARD PACKAGE ASSEMBLY HAVING ENHANCED SECURITY

(75) Inventors: Donald Kingsborough, Danville, CA (US); Talbott Roche, Belvedere, CA (US); Amie Petersen, Livermore, CA (US); Teri Llach, Palo Alto, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 1111 days.

(21) Appl. No.: 11/380,888

(22) Filed: Apr. 28, 2006

(65) Prior Publication Data

US 2007/0252009 A1 Nov. 1, 2007

(51) Int. Cl.
*G06K 5/00* (2006.01)

(52) U.S. Cl. .................. 235/380; 235/383; 235/449

(58) Field of Classification Search .................. 235/380, 235/375, 449, 383
See application file for complete search history.

(56) References Cited

U.S. PATENT DOCUMENTS

| | | | |
|---|---|---|---|
| 4,722,376 A | 2/1988 | Rhyner | |
| 4,887,763 A | 12/1989 | Sano | |
| 4,937,963 A | 7/1990 | Barnes | |
| 5,281,799 A | 1/1994 | McIntire et al. | |
| 5,390,794 A | 2/1995 | Vulpitta | |
| 5,399,021 A | 3/1995 | Litt | |
| 5,609,253 A | 3/1997 | Goade, Sr. | |
| 5,650,209 A * | 7/1997 | Ramsburg et al. | 428/43 |
| D385,488 S | 10/1997 | Smith et al. | |
| 5,720,158 A | 2/1998 | Goade, Sr. | |
| 5,735,550 A | 4/1998 | Hinkle | |
| 5,740,915 A | 4/1998 | Williams | |
| D394,387 S | 5/1998 | Williams | |
| 5,760,381 A | 6/1998 | Stich et al. | |
| 5,777,305 A | 7/1998 | Smith et al. | |
| 5,791,474 A | 8/1998 | Hansen | |
| 5,839,763 A | 11/1998 | McCannel | |
| 5,842,629 A | 12/1998 | Sprague et al. | |
| D411,765 S | 7/1999 | Holihan | |
| 5,918,909 A | 7/1999 | Fiala et al. | |
| 5,921,584 A | 7/1999 | Goade, Sr. | |
| 5,949,058 A | 9/1999 | Kimura | |
| 5,958,174 A | 9/1999 | Ramsberg et al. | |
| 5,969,324 A * | 10/1999 | Reber et al. | 235/462.13 |
| 5,975,302 A | 11/1999 | Young | |
| 5,997,042 A | 12/1999 | Blank | |
| 6,053,321 A | 4/2000 | Kayser | |
| 6,076,296 A | 6/2000 | Schaeffer | |
| 6,089,611 A | 7/2000 | Blank | |

(Continued)

OTHER PUBLICATIONS

U.S. Appl. No. 11/380,838, filed on Apr. 28, 2006, entitled "Hybrid Transaction Card Package Assembly."

(Continued)

*Primary Examiner*—Ahshik Kim
(74) *Attorney, Agent, or Firm*—Conley Rose, P.C.; Rodney B. Carroll (57) ABSTRACT

A transaction card package assembly comprising a transaction card connected to a first panel via a releasable interface, wherein the first panel is affixed to a second panel such that upon releasing the interface, the first panel remains affixed to the second panel and the transaction card is released from the package assembly.

51 Claims, 9 Drawing Sheets

U.S. PATENT DOCUMENTS

| | | | |
|---|---|---|---|
| 6,109,439 | A | 8/2000 | Goade, Sr. |
| 6,161,870 | A | 12/2000 | Blank |
| 6,173,901 | B1 | 1/2001 | McCannel |
| 6,199,757 | B1 | 3/2001 | Kubert |
| 6,224,108 | B1 | 5/2001 | Klure |
| 6,270,012 | B1 | 8/2001 | Dawson |
| 6,305,717 | B1 | 10/2001 | Chess |
| 6,315,206 | B1 | 11/2001 | Hansen et al. |
| 6,328,341 | B2 | 12/2001 | Klure |
| 6,358,607 | B1 | 3/2002 | Grotzner et al. |
| 6,418,648 | B1 | 7/2002 | Hollingsworth et al. |
| 6,439,613 | B2 | 8/2002 | Klure |
| 6,454,165 | B1 | 9/2002 | Dawson |
| 6,457,649 | B1 | 10/2002 | Hileman |
| 6,471,127 | B2 | 10/2002 | Pentz et al. |
| 6,543,809 | B1 | 4/2003 | Kistner et al. |
| 6,588,658 | B1 | 7/2003 | Blank |
| 6,619,480 | B2 | 9/2003 | Smith |
| 6,640,974 | B2 | 11/2003 | Malone |
| 6,679,970 | B2 | 1/2004 | Hwang |
| 6,698,116 | B2 | 3/2004 | Waldron |
| 6,708,820 | B2 | 3/2004 | Hansen et al. |
| 6,715,795 | B2 | 4/2004 | Klure |
| 6,729,656 | B2 | 5/2004 | Kubert et al. |
| D493,829 | S | 8/2004 | Foster |
| 6,832,720 | B2 | 12/2004 | Dawson |
| 6,918,537 | B2 | 7/2005 | Graves et al. |
| 6,929,413 | B2 | 8/2005 | Schofield |
| D509,654 | S | 9/2005 | Miller |
| 6,957,737 | B1 | 10/2005 | Frederickson et al. |
| 6,991,155 | B2 | 1/2006 | Burchette, Jr. |
| 7,188,762 | B2 * | 3/2007 | Goade et al. ............ 235/380 |
| 7,219,835 | B2 | 5/2007 | Graves et al. |
| 2002/0100797 | A1 | 8/2002 | Hollingsworth et al. |
| 2002/0185543 | A1 | 12/2002 | Pentz et al. |
| 2003/0004889 | A1 | 1/2003 | Fiala et al. |
| 2003/0018586 | A1 | 1/2003 | Krahn |
| 2003/0066777 | A1 | 4/2003 | Malone |
| 2003/0132132 | A1 | 7/2003 | Small |
| 2003/0150762 | A1 | 8/2003 | Biller |
| 2004/0182940 | A1 | 9/2004 | Biller |
| 2005/0061889 | A1 | 3/2005 | McGee et al. |
| 2005/0080730 | A1 | 4/2005 | Sorrentino |
| 2005/0140135 | A1 | 6/2005 | Miller et al. |
| 2005/0242193 | A1 * | 11/2005 | Smith et al. ............ 235/487 |
| 2007/0090184 | A1 * | 4/2007 | Lockwood et al. ........ 235/380 |

OTHER PUBLICATIONS

U.S. Appl. No. 11/380,881, filed on Apr. 28, 2006, entitled "Transaction Card Package Assembly Having Enhanced Security."

Foreign communication from a related counterpart application—International Search Report and Written Opinion, PCT/US07/67811, Nov. 16, 2007, 11 pages.

* cited by examiner

TRANSACTION CARD PACKAGE ASSEMBLY HAVING ENHANCED SECURITY

CROSS-REFERENCE TO RELATED APPLICATIONS

This application is related to commonly owned U.S. patent application Ser. No. 11/380,881, filed Apr. 28, 2006 and entitled "Transaction Card Package Assembly Having Enhanced Security," which is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to package assemblies for transaction cards such as gift cards, debit cards, credit cards, and the like.

BACKGROUND OF THE INVENTION

The market for transaction cards such a merchant gift cards continues to grow. Such cards may be subject to fraud, for example by a thief removing a valid gift card from a card holder that is used to activate the card, and inserting a fraudulent gift card in the holder. This activity, sometimes referred to a swapping, results in activation of the valid card held by the thief and non-activation of the fraudulent card held by the unsuspecting consumer. As a result an ongoing need exists for improved transaction card package assemblies, which is addressed by the present disclosure.

SUMMARY OF THE INVENTION

A transaction card package assembly comprising a transaction card connected to a first panel via a releasable interface, wherein the first panel is affixed to a second panel such that upon releasing the interface, the first panel remains affixed to the second panel and the transaction card is released from the package assembly.

BRIEF DESCRIPTION OF THE DRAWINGS

FIGS. 1A-8A are front views and FIGS. 1B-8B are back views of various embodiments of transaction card package assemblies according to the present disclosure.

DETAILED DESCRIPTION OF THE PREFERRED EMBODIMENTS

As used herein, transaction card refers to a card that may be used to transact business with a party willing to accept the card, for example as tender for a purchase. Examples of such cards include credit cards, debit cards, gift cards, telephone cards, loyalty cards, membership cards, ticket cards, entertainment cards, sports cards, prepaid cards, and the like. Typically, such cards are wallet-sized and made of plastic. In various embodiments, the transaction card may be a type of card such as a gift or prepaid card that requires activation at a point of sale. For example, a transaction card may be purchased and activated at a point of sale by a consumer and subsequently used by the consumer or another (e.g., the recipient of the card as a gift) to transact business.

Purchase of a transaction card may involve a card vendor, a redeeming merchant, and a card issuer. In various embodiments, the card vendor, redeeming merchant and card issuer may be the same, different, or related entities. The point of sale where the card is purchased and activated is referred to herein as the card vendor or simply vendor. An entity that will accept the card for business transactions, for example as tender for a purchase, is referred to as a redeeming merchant. An entity that provides the financial backing and/or payment processing accessed via the transaction card is referred to as the card issuer or simply issuer. Typically, the issuer is identified on the transaction card and associates a unique issuer account code with each transaction card. Card issuers include direct issuers of cards such as store-branded cards, and in some embodiments the card vendor may also be the card issuer and/or the redeeming merchant. Card issuers also include banks, financial institutions, and transaction processors such as VISA, Mastercard, American Express, etc., and cards issued by such institutions may be readily accepted by a number of redeeming merchants to conduct transactions such as purchases. In some instances, the redeeming merchant may be identified on the transaction card (for example, a retailer branded card such as Store X), and such cards may be sold at the same or different card vendor (e.g., card vendor is Store X or a different or unrelated Store Z). In such instances, the Store X branded transaction card may be issued by Store X, by Store Z, or by a third party such as bank or financial institution.

In an embodiment a transaction card package assembly comprises a transaction card attached/coupled to or disposed/held within a card holder. The transaction card package assembly further comprises a security code spanning the transaction card and the card holder such that upon removal of the transaction card from the holder, the security code is broken and a portion of the security code is present on the transaction card and a portion of the security code is present on the card holder. The security code may be integral with and form a part of the transaction card and card holder, for example formed concurrently during molding and/or printing of the transaction card and/or the card holder. Alternatively, the security code may be external to the transaction card and card holder, for example printed and/or applied via a sticker or other external layer applied/adhered to the transaction card and card holder.

Upon removal of the transaction card from the card holders the security code is broken and a portion of the security code remains on the transaction card and a portion of the security code remains on the card holder. The broken portions of the security code are configured such that they may not be readily removed from their respective substrate and applied to another substrate, and in particular without damaging or destroying the security code portion and/or the substrate. For example, where the security code is integral with the transaction card and card holder, e.g., printed and/or embossed in a manner that spans each, such printing and/or embossing may be difficult or nearly impossible to remove from the transaction card and/or card holder and place on a substitute transaction card and/or card holder, respectively. As another example, where the security code is printed on a sticker or other layer that spans the transaction card and the card holder, the sticker or other layer should be sufficiently adhered, affixed, or otherwise configured (for example, with serrations, such that the portions of the sticker or other layer remaining on the transaction card and/or card holder would be difficult or nearly impossible to remove intact and place on a substitute transaction card and/or card holder, respectively.

Given that each security code is unique, portions of security codes from different transaction cards and card holders will not match, and thus will be readily identifiable, for example by visible and/or tactile inspection, by a merchant or consumer as an indicator of possible tampering or fraudulent activity. For example, in the event that a first transaction card is removed from a first card holder (thereby breaking a first security code with portions thereof remaining on the first transaction card and first card holder) and a second transaction card is removed from a second card holder (thereby breaking a second security code with portions thereof remaining on the second transaction card and second card holder), the portions of the first and second security codes do not match when the first transaction card is placed in the second card holder or vice-versa.

The security code is unique to each transaction card package assembly, and the uniqueness of the security code provides a means to detect potentially fraudulent activity and/or to disable a package assembly subject to fraudulent activity. The security code may comprise a series of letters, numerals, characters, or combinations thereof. Such letters, numerals, characters, and combinations thereof may be readily found in any number of font sets. The security code may be randomly generated, and preferably contains a sufficient number of letters, numerals, characters, or combinations thereof to avoid an accidental duplication of the security code during manufacture of the transaction card package assembly. For example, the security code may include greater than 4, 6, 8, 10, 12, 14, etc. letters, numbers, characters, or combinations thereof, with a larger number being preferred. Alternatively or in addition to letters, numbers, and characters, the security code may comprise symbols, pictures, designs, graphics, or combinations thereof. In an embodiment, the security code is printed and/or embossed across a portion of the transaction card and card holder, for example across an interface such as a score or break line between the two.

In an embodiment, the security code is positioned such that a longitudinal center axis of the security code is in registration with the interface between the transaction card and the card holder, wherein upon breaking of the security code, a first longitudinal portion or half of the security code remains with the transaction card and a second longitudinal portion or half of the security code remains with the card holder. The interface between the transaction card and the card holder may be configured such that the transaction card disengages/releases from the card holder along the interface. In some embodiments, a retaining means may define the interface between the security code and the card holder. Non-limiting examples of retaining means include an adhesive, for example a contact adhesive such as rubberized glue or cement; hook and loop fastener; clips; rivets; snap and break connections; perforations; cut-outs, inserts, and/or pockets; or combinations thereof.

In an embodiment, the interface between the transaction card and the card holder may be a fault, break, score, or perforation line in a snap and break connection. For example, the transaction card and card holder may be molded from plastic with a score line defining the interface, whereby the transaction card may be removed from the card holder by folding the card along the score line wherein the plastic card snaps and breaks free from the plastic holder. In an alternative embodiment, the interface comprises a perforated line in a fold and tear connection. For example, the transaction card and the card holder may be printed on a sheet of rigid paper such as cardboard with a perforated line defining the interface, whereby the transaction card may be removed from the card holder by folding the card along the perforated line and tearing the card from the holder.

In certain embodiments, the security code may also serve a secondary or dual purpose, such as encoding information useful for purchase and/or activation of the transaction card. For example, the dual purpose security code may comprise a unique bar code that may be scanned at a point of sale terminal to purchase and/or activate the transaction card. An example of such a unique bar code is an EAN/UCC-128 bar code, containing both a vendor product identification portion and an issuer account portion. The EAN/UCC-128 bar code may be used to activate the card via a one-step process.

In a one-step activation sequence, the one step comprises simultaneously entering the combination vendor product identification and issuer account code at a point of sale terminal.

The one-step process only requires a single entry by a clerk operating the point of sale terminal to activate the transaction card. For example, the one step may be performed at the point of sale terminal by scanning a bar code, for example an EAN/UCC-128 bar code, containing both a vendor product identification portion and an issuer account portion. The vendor product identification portion may be used to perform a look-up to determine product identity and price. The issuer account portion may be used to activate the particular account associated with the transaction card such that the card may be used to transact business with the issuer of the card. Upon being entered at the point of sale terminal, the issuer account code may be conveyed (for example, via a computer network) to the issuer or other third party processor responsible for looking up the account code (for example, via a database reconciliation) and activating same.

By breaking the dual purpose security code, the bar code is likewise broken, and thus is disabled and can not be used to purchase and/or activate the transaction card unless both potions are present and match. An attempt to fraudulently swap transaction cards in a holder fails because the portions of the unique bar code do not match, and thus may not be scanned. Furthermore, a mismatched security code provides a visual and/or tactile indication of possible tampering or fraudulent activity.

Figure 1A:
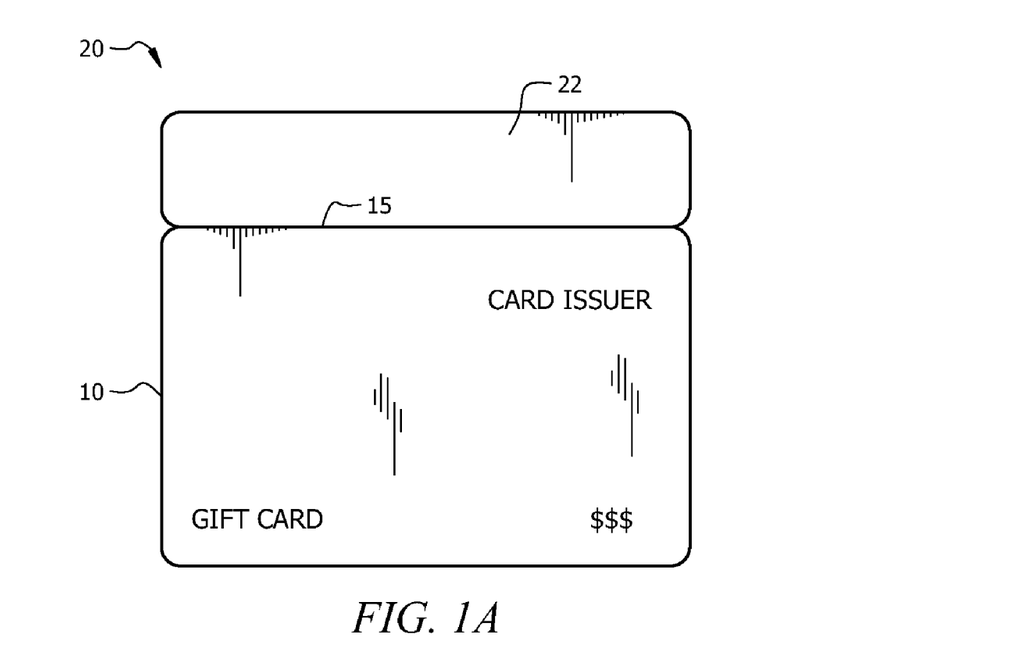
Figure 1B:
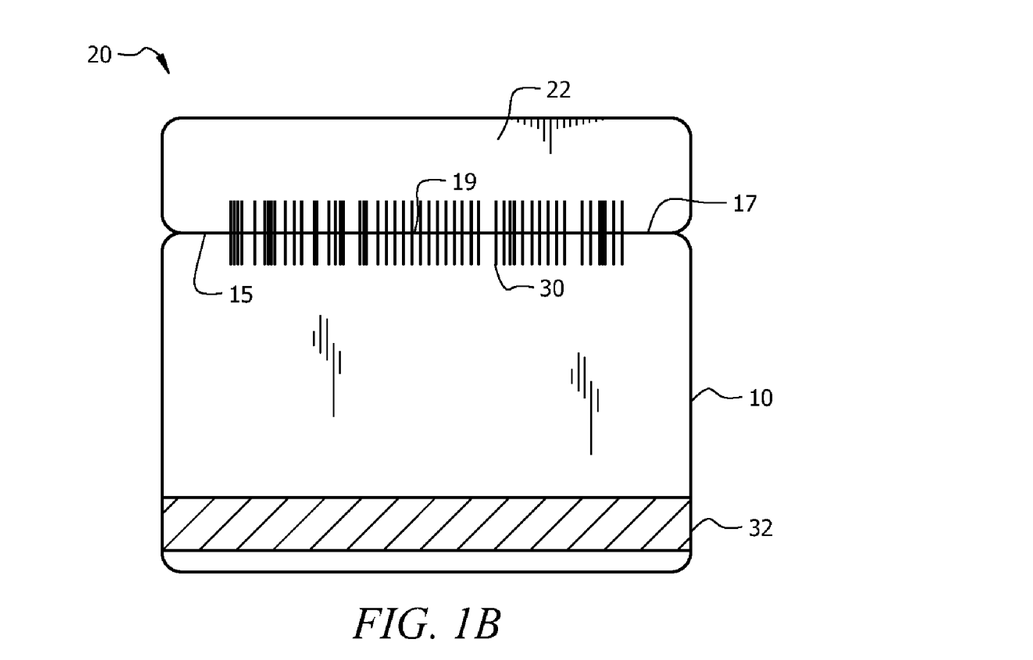

A first embodiment of a transaction card package assembly 20 is shown in the front view of FIG. 1A and the back view of FIG. 1B. The transaction card package assembly 20 comprises a card 10 releasably attached by a retaining means 15 to a card holder, for example a panel 22 such as a plastic or cardboard panel. Other types of card holders may be used such as envelopes; folding cards with cut-outs, inserts, and/or pockets; clips; hangers; etc. Non-limiting examples of retaining means 15 include an adhesive, for example a contact adhesive such as rubberized glue or cement; hook and loop fastener; clips; rivets; snap and break connections (as shown); perforations; cut-outs, inserts, and/or pockets; or combinations thereof. The card 10 further comprises a magnetic stripe 32 on the back thereof.

The retaining means 15 may define an interface 17, for example a score or break line in a snap and break connection (as shown), between the transaction card 10 and the card holder 22. As shown in FIG. 1B, a security code, for example an EAN/UCC-128 bar code 30, may span the interface 17 between the transaction card 10 and the card holder 22. Further as shown in FIG. 1B, security code 10 may be positioned such that the interface 17 is registered to a longitudinal center axis of the bar code 30, as is shown by line 19 running horizontally through bar code 30. It should be understood that line 19 represents a score line or indentation in the card/holder substrate (e.g., plastic), and does not interfere with the scanning of bar code 30 prior to breakage of the retaining means 15 at the interface 17. The EAN/UCC-128 bar code may be broken along a substantially horizontal axis running across about the middle of the bar code or alternatively may be broken along non-centered axis such as through a numerical portion below the vertical bar portion of the code.

Figure 1C:
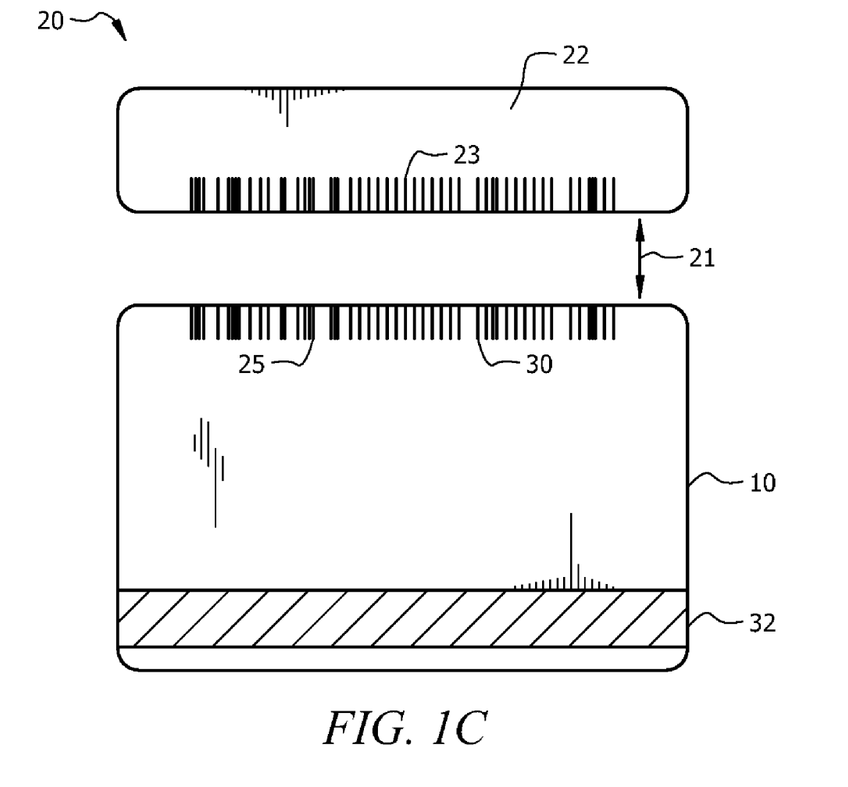
FIG. 1C is a back view of a separated embodiment of a transaction card package assembly.
Figure 1D:
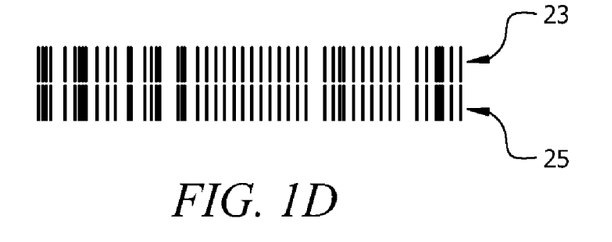
FIG. 1D is a close-up view of an embodiment of a mismatched security code.

As shown in FIG. 1C, upon breakage and separation of the transaction card 10 from the card holder 22 as represented by arrow 21, a portion 23 of the security code (e.g., bar code 30) remains on the card holder 22 and a portion of the security code (e.g., bar code 30) remains on the transaction card 10. In a broken and separated state as shown in FIG. 1C, each portion 23 and 25 of bar code 30 is inoperable by itself to scan and activate the transaction card at a point of sale terminal. However, the portions 23 and 25, provided that they are from the same bar code 30, may be recombined and form an operable bar code 30. In contrast, if the portions 23 and 25 are not from the same bar code, for example where a thief attempts to fraudulent swap cards, a combination of disparate or mismatched portions will not form an operable bar code 30. Furthermore, such an attempt may provide a visual and/or tactile indication of possible fraudulent activity. For example, as shown in a close-up view of FIG. 1D, the portions 23 and 25 of the security code may display a readily identifiable mismatch upon visual inspection.

Figure 2A:
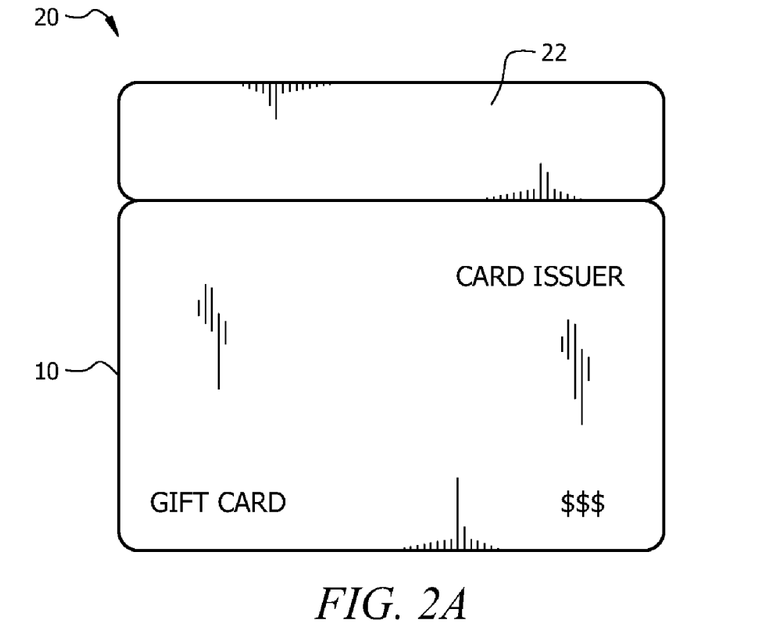
Figure 2B:
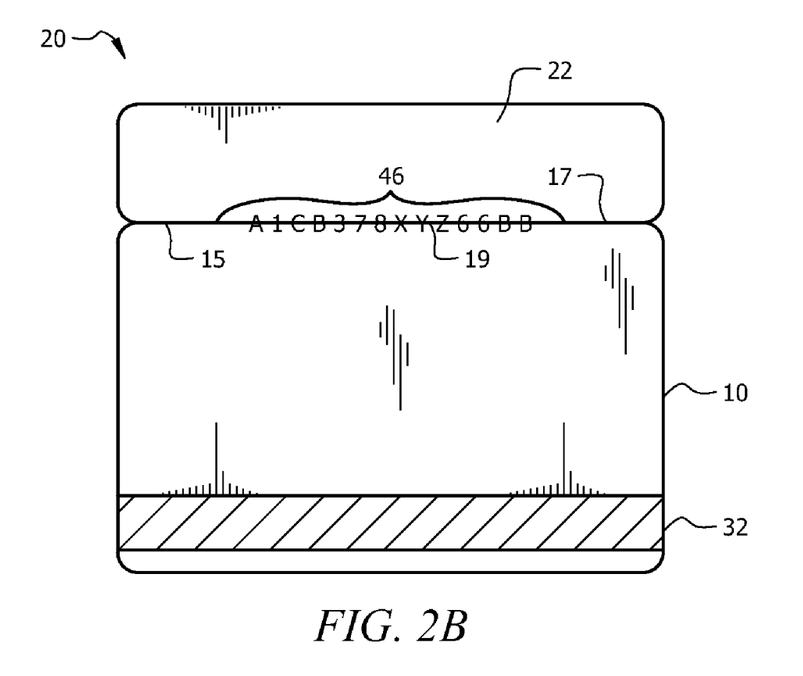
Figure 3A:
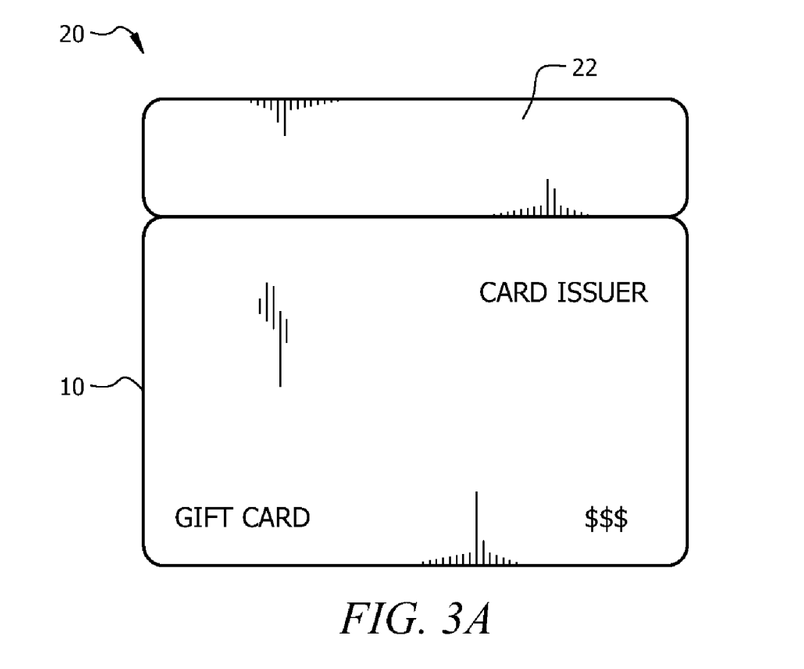
Figure 3B:
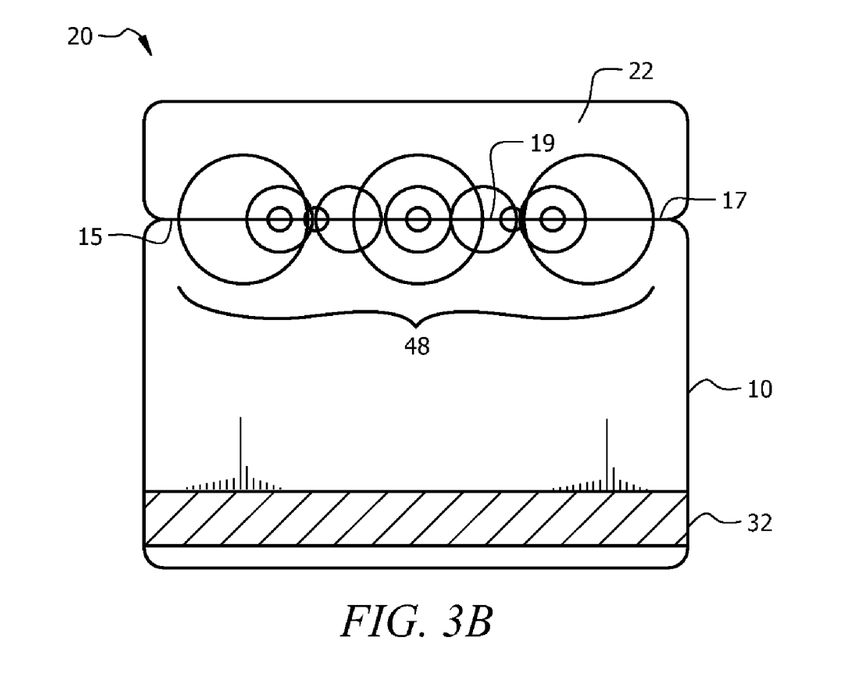

Alternative types of security codes may provide mismatches that are more readily identifiable than with a bar code. Examples of alternative security codes include but are not limited to second embodiment of a transaction card package assembly 20 having an alpha numeric security code 46 (provided that each such alpha numeric code is unique) as shown in the back view of FIG. 2B and a third embodiment of a transaction card package assembly 20 having a graphical security code 48 (provided that each such graphic is unique) as shown in the back view of FIG. 3B.

Figure 4A:
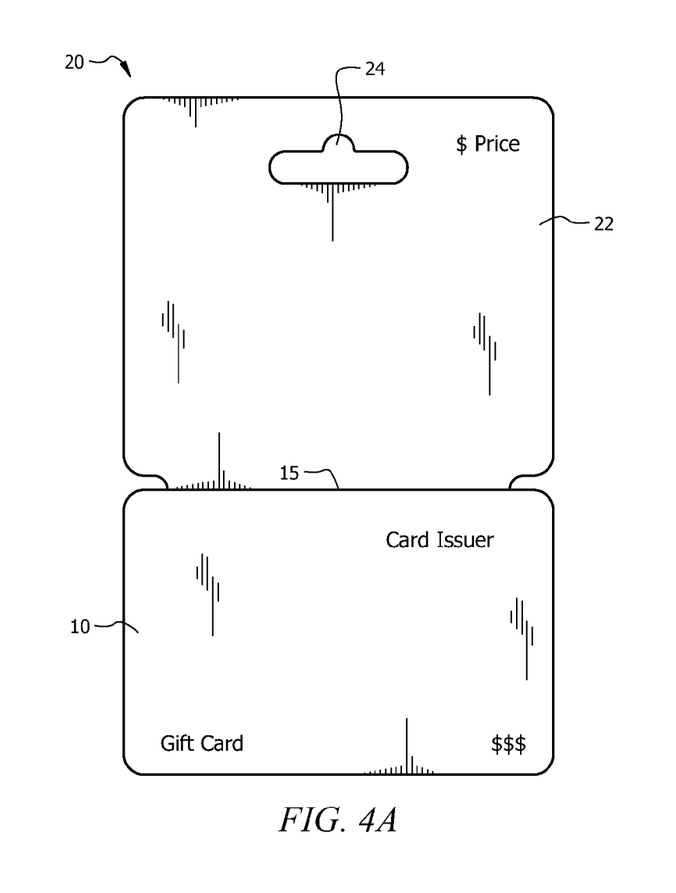
Figure 4B:
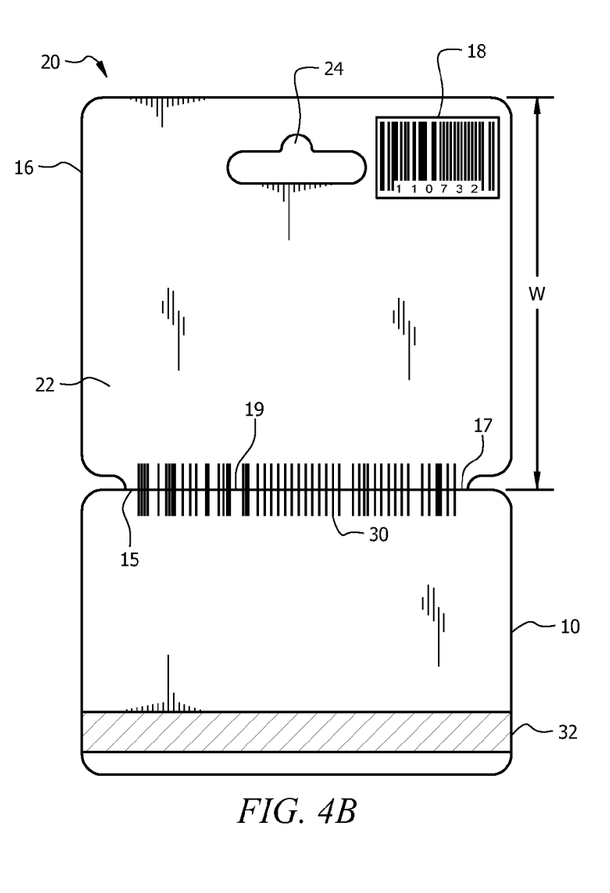

A fourth embodiment of a transaction card package assembly 20 is shown in the front view of FIG. 4A and the back view of FIG. 4B. The fourth embodiment is similar to the first embodiment shown in FIGS. 1A and 1B as described previously, and in FIG. 4 the panel 22 has been increased in size, and more specifically increased in width W. The additional surface area of panel 22 may be useful as space for printing advertising, information, instructions, legal notices, and the like. The width W may also be adjusted as desired to provide overall dimensions for package assembly 20 suitable for use in various display racks. Panel 22 may also include an opening 24 such as a "sombrero" shaped aperture or cut-out suitable for receiving a shelf or rack rod and hanging the package assembly 20 from a display rack in a retail store. Panel 22 may also include a bar code 18, which may provide three unique identifiers and forming a hybrid package assembly capable of either one-step or two-step activation, as is described in more detail in copending U.S. patent application Ser. No. 11/380,838, filed Apr. 28, 2006 and incorporated by reference herein in its entirety. Any of the embodiments disclosed herein may be further modified to include three unique identifiers and thereby form hybrid package assemblies as described in U.S. patent application Ser. No. 11/380,838. In such a: hybrid package assembly 20 as shown in FIG. 4, breaking the security code 30 disables the one-step activation, but two step activation by scanning bar code 18 and swiping transaction card 10 is still functional.

Figure 5A:
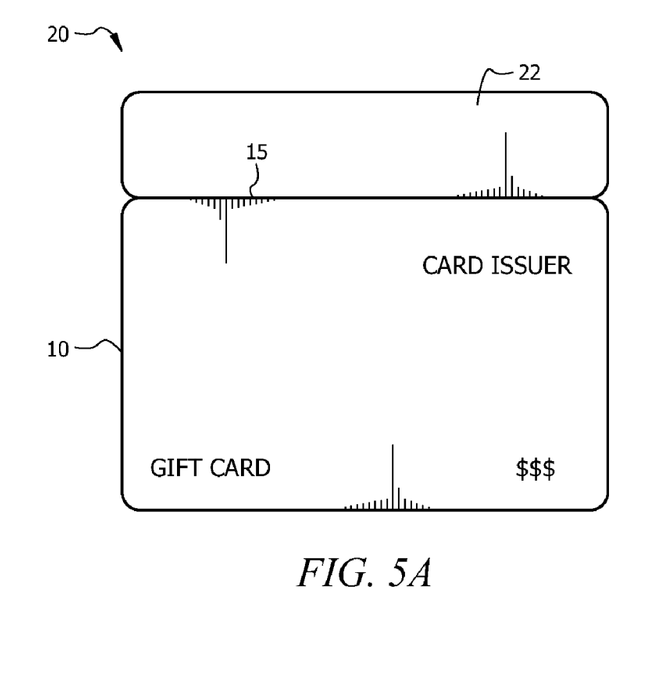
Figure 5B:
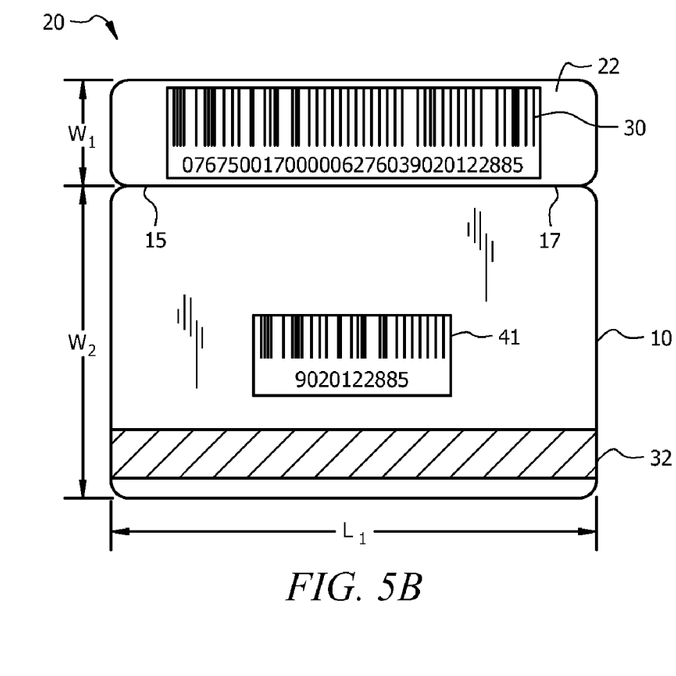

A fifth embodiment of a transaction card package assembly 20 is shown in the front view of FIG. 5A and the back view of FIG. 5B. The fifth embodiment does not contain a security code as described herein, as bar code 30 does not span interface 17. Instead, bar code 30 is contained entirely within panel 22. The transaction card 10 may contain a magnetic stripe 32, an issuer bar code 41, or both (as shown). In an embodiment, the issuer bar code 41 is a UCC-12 bar code. In an embodiment, the bar code 30 is an EAN/UCC-128 bar code, containing both a vendor product identification portion and an issuer account portion, that may be used to activate the card via a one-step process. The magnetic stripe 32, the issuer bar code 41, or both (as shown) my contain a corresponding issuer account code such that the activated transaction card may be used at the issuer's place of business to conduct transactions such as the purchase of goods.

Preferably, the retaining means 17 is a snap and break connection between a plastic transaction card 10 and panel 22 or a perforated connection between paper or cardboard transaction card 10 and panel 22. The length $L_1$ of panel 22 may be greater than, less than, or preferably about equal to (as shown) the length $L_1$ of the transaction card 10. Likewise, the width $W_1$ of panel 22 may be greater than, equal to, or preferably less than (as shown) the width $W_2$ of the transaction card 10. In an embodiment, $W_1$ is less than about ¾ of $W_2$, alternatively $W_1$ is less than about ½ of $W_2$, alternatively $W_1$ is about ⅓ of $W_2$. In an embodiment, the length $L_1$ of panel 22 and transaction card 10 is about 3 ⅜ inches, the width $W_1$ of the panel 22 is about ¾ inch, and the width $W_2$ of the transaction card 10 is about 2 ⅛ inches.

Figure 6A:
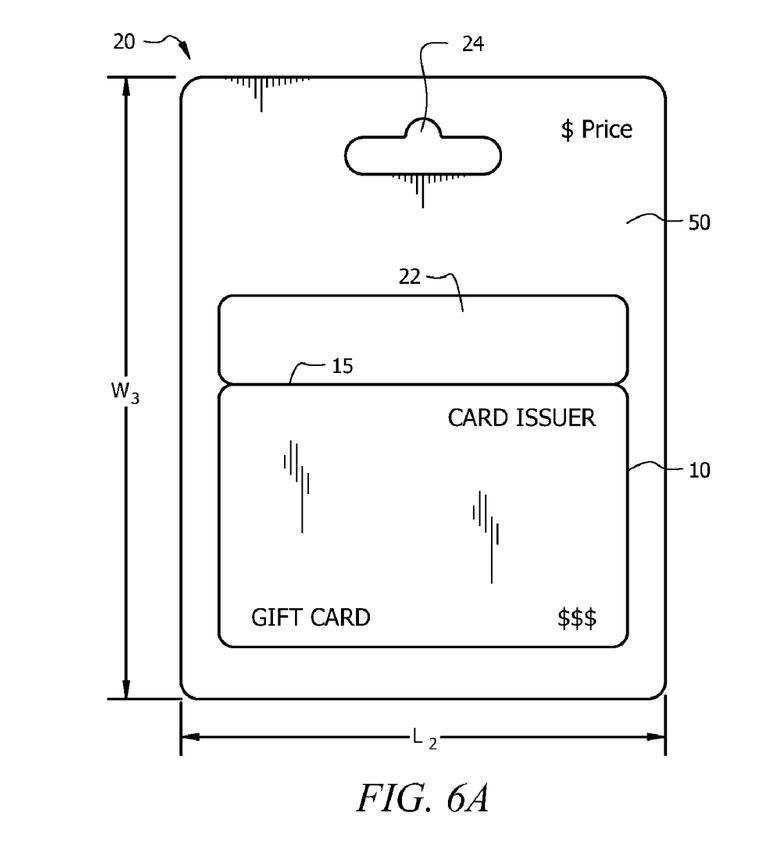
Figure 6B:
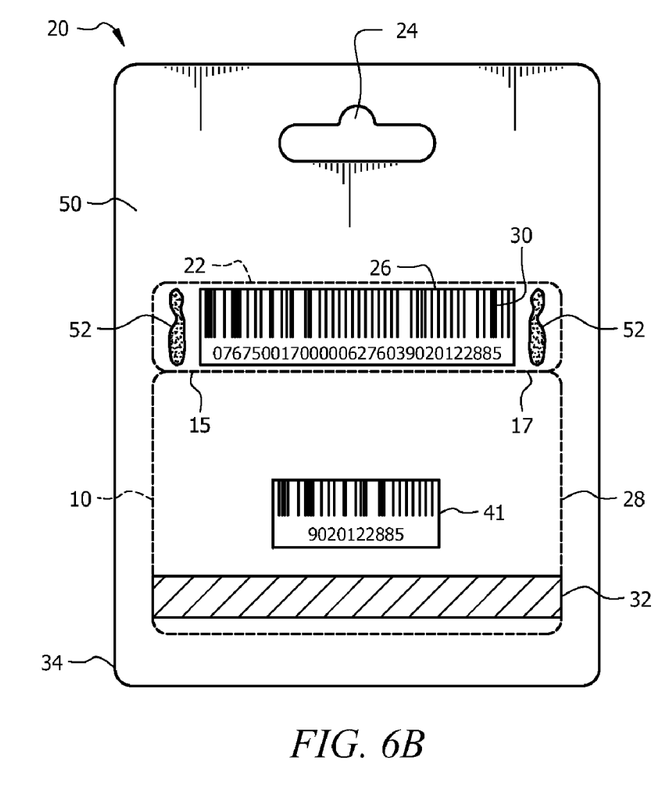

A sixth embodiment of a transaction card package assembly 20 is shown in the front view of FIG. 6A and the back view of FIG. 6B. The sixth embodiment comprises the fifth embodiment of FIG. 5 attached/affixed on a rack hanger 50. The rack hanger 50 may comprise a panel (as shown), a folding card having two or more panels, an envelope having two or more panels, or combinations thereof. The panel 22 is attached to the rack hanger 50 by attachment means 52 such as adhesive, tacks, staples, rivets, or combinations thereof. The attachment means 52 holds the panel 22 firmly in contact with rack hanger 50 such that the transaction card 10 may b e removed from the panel 22 and rack hanger 50, for example by snapping and breaking the interface 17 or tearing a perforated interface 17. Transaction card 10 typically is not attached directly to the rack hanger 50 (except via panel 22), which aids in the removal of card 10 from the remainder of package assembly 20, aids in the activation of the transaction card via a two-step process, or aids in both.

The rack hanger 50 further comprises an opening 24 and window 26. Opening 24 may be a "sombrero" shaped aperture or cut-out suitable for hanging the package assembly 20 from a rod in a display rack or shelf in a retail store. The window 26 may be an aperture or cut-out or alternatively may be a transparent portion such as a cut-out covered by a clear film. In the back view shown in FIG. 6B, the position of card 10 and panel 22 is indicated by dashed line 28. As is shown in FIG. 6B, the panel 22 is positioned and attached via attachment means 52 to rack hanger 50 such that a bar code 30 located on the back of panel 22 is visible through window 26. In an embodiment, bar code 30 is an EAN/UCC-128 bar code containing both a vendor product identification portion and an issuer account portion encoded thereon. In the embodiment shown in FIG. 6B, the issuer bar code 41 is obscured from view by the rack hanger 50.

The length $L_2$ of rack hanger 50 may be less tan, equal to, or preferably greater than (as shown) the length $L_1$ of the transaction card 10 and panel 22. Likewise, the width $W_3$ of rack hanger 50 may be less than, equal to, or preferably greater than (as shown) the combined width $W_1+W_2$ of the transaction card 10 and panel 22. In an embodiment, the length $L_1$ of panel 22 and transaction card 10 is about 3⅜ inches, the width $W_1$ of the panel 22 is about ¾ inch, the width $W_2$ of the transaction card 10 is about 2⅛ inches, the length $L_2$ of rack hanger 50 is about 4 inches and the width $W_3$ of rack hanger 50 is about 5¼ inches.

In an alternative embodiment of FIG. 6, the rack hanger 50 may Farther comprise a bar code, for example an EAN/UCC-12 bar code, containing a vendor product identification code, such as bar code 18 shown in FIG. 4B. The bar code 18 may be located on the front of rack hanger 50, on the back of rack hanger 50 (as shown in FIG. 4), or both. In an embodiment, the bar code 18 is positioned on an upper portion 16 of the rack hanger 50, for example in an upper corner of rack hanger 50 adjacent the opening 24. Positioning the bar code 18 on the upper portion 16 of the rack hanger 50 distances the bar code 18 from other bar codes that may be present elsewhere on the package assembly (e.g., bar code 30), and may thereby aid in the scanning of the bar codes. The card 10 further comprises a magnetic stripe 32, which is accessible for swiping at a point of sale terminal. For example, a lower portion 34 of the rack hanger 50 may be folded back such that the magnetic stripe may be swiped through a magnetic stripe reader at the point of sale terminal. In an alternative embodiment, the rack hanger 50 contains a magnetic stripe, for example located on the lower portion 34 of rack hanger 50. The card 10 may also have a magnetic stripe 32, wherein the magnetic stripe on the rack hanger 50 and the magnetic stripe 32 on the card 10 each contain the same issuer account code. In addition to or in lieu of the magnetic stripe 32, the card 10 may have a issuer bar code 41, wherein the issuer bar code 41 and the magnetic stripe on the rack hanger 50 each contain the same issuer account code. The presence of bar code 18, bar code 30, and magnetic stripe 32 may result in a hybrid package assembly, as is described in more detail in U.S. patent application Ser. No. 11/380,838, which may be activated by either a one-step or two-step activation process.

The transaction card 10 may be folded and/or pulled forward away from the rack hanger 50, thereby snapping and breaking the interface 17 to remove the card from the package assembly 20. Alternatively, the transaction card 10 may be folded and/or pulled forward away from the rack hanger 50, thereby tearing the perforated interface 17 to remove the card from the package assembly 20. Upon removal of the card, the upper half of the snap and break or perforated connection, i.e., panel 22, remains affixed to the rack hanger 50. After activation of the transaction card 10 and removal of the card from the package assembly 20, the remainder of the package assembly may be discarded.

In alternative embodiments of FIGS. 5 and 6, a security code may span between the card 10 and the panel 22 as described previously, for example as shown in FIGS. 1-4. In an embodiment the security code is all or a portion of bar code 30. For example, the numeric sequence below bar code 30 might span the interface and provide the security code, while the vertical lines representing the bar code remain above the interface 17. In an alternative embodiment, a security code is placed below bar code 30, for example a unique alphanumeric sequence or graphical design that is independent from bar code 30.

Figure 7A:
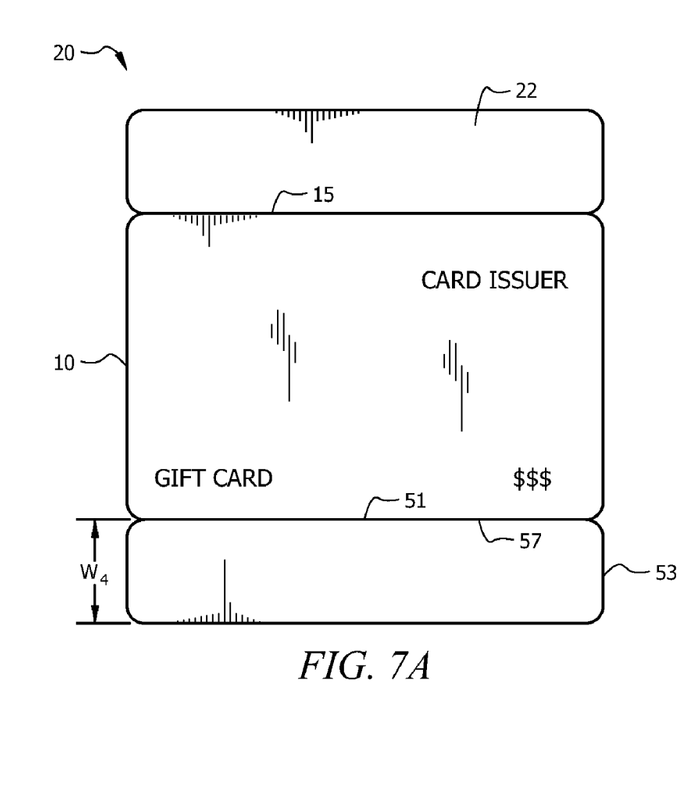
Figure 7B:
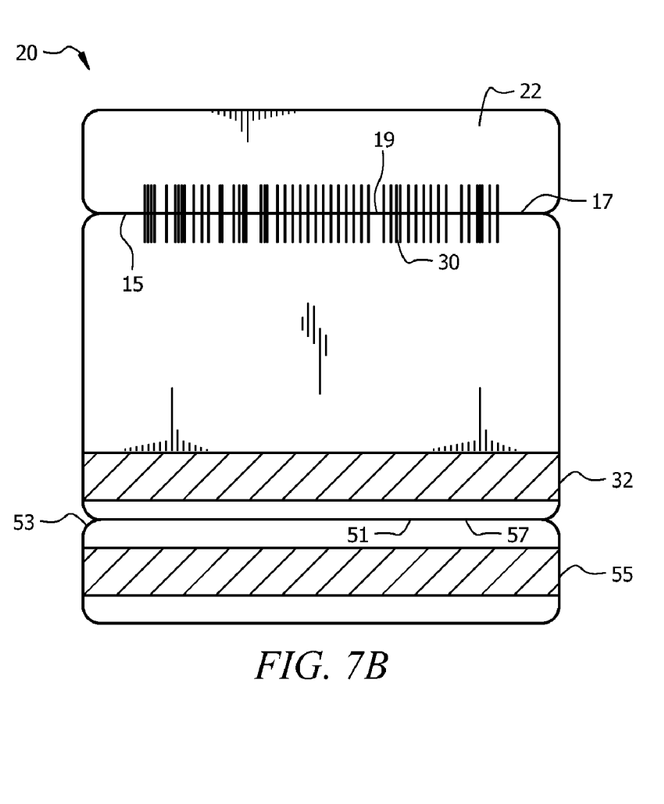

A seventh embodiment of a transaction card package assembly 20 is shown in the front view of FIG. 7A and the back view of FIG. 7B. The seventh embodiment is similar to the first embodiment and further comprising a second retaining means 51 and a second panel 53. In an embodiment, the second retaining means 51 defines a second interface 57, for example a score or break line in a snap and break connection between the transaction card 10 and the second panel 53. The second panel 53 further comprises a second magnetic stripe 55, wherein the magnetic stripe 55 is separate and distinct from the magnetic stripe 32. For example, the magnetic stripe 55 may comprise the issuer account code such that upon activation the card may be used at a redeeming merchant. In contrast, the magnetic stripe 55 may contain may contain an activation code that is indexed to the issuer account code; contained in magnetic stripe 32 on the card 10. Thus, to activate the card, the activation code on magnetic stripe 55 is read at a point of sale, and the activation code is used to cross-reference and activate the issuer account on card 10. Upon activation, the panels 22 and 53 may be removed from the card, for example via snapping and breaking along the interfaces 17 and 57, respectively. In an alternative embodiment, the panel 22 may be sized as described previously, and may further comprise an opening 24, for example as is shown in FIG. 4.

The use of an activation code on magnetic stripe 55 may help to prevent a fraudulent activity known as skimming, wherein the issuer account code is read from the magnetic stripe 32 on the card (for example with a handheld magnetic stripe reader) and a duplicate, fraudulent card is produced having the same issuer account code. Upon activation of the card 10 by an unsuspecting customer, the fraudulent duplicate card is likewise activated and can be used by a thief. In addition to providing a useless activation code upon being skimmed (rather than the actual issuer account code), the second panel 53 further provides a physical barrier that prevents swiping of the bar code 32 on the card 10, and thereby provides an additional protection again skimming. For example, the width $W_4$ of the panel 53 may be selected such that the bar code 32 on card 10 is positioned above the normal slot depth of a magnetic card reader, and thus cannot be easily swiped by such readers in an effort to skim the card. In an embodiment, the width $W_4$ is greater than about ½ inch, alternatively greater than about ¾ inch, alternatively greater than about 1 inch.

Figure 8A:
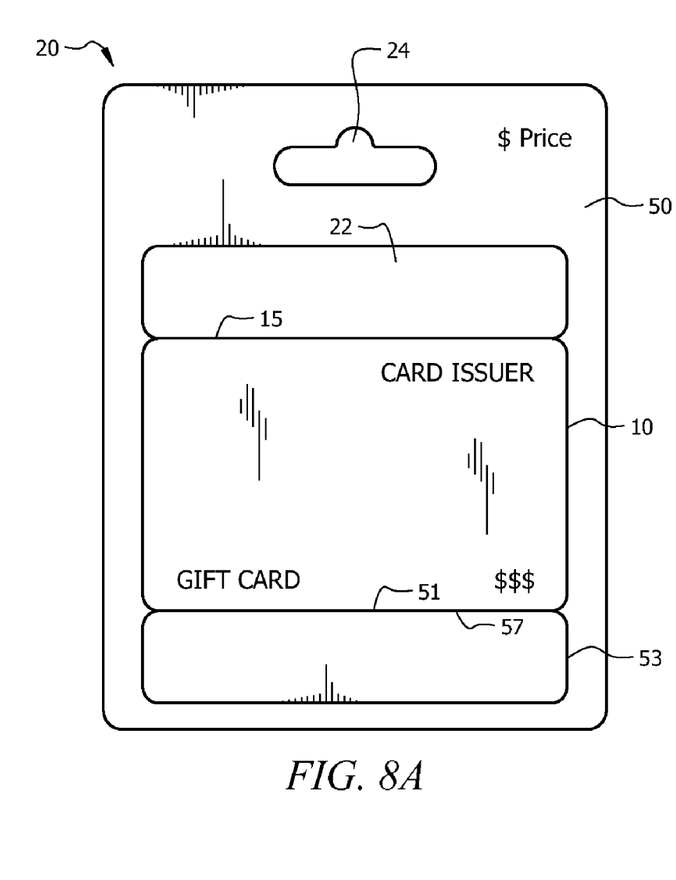
Figure 8B:
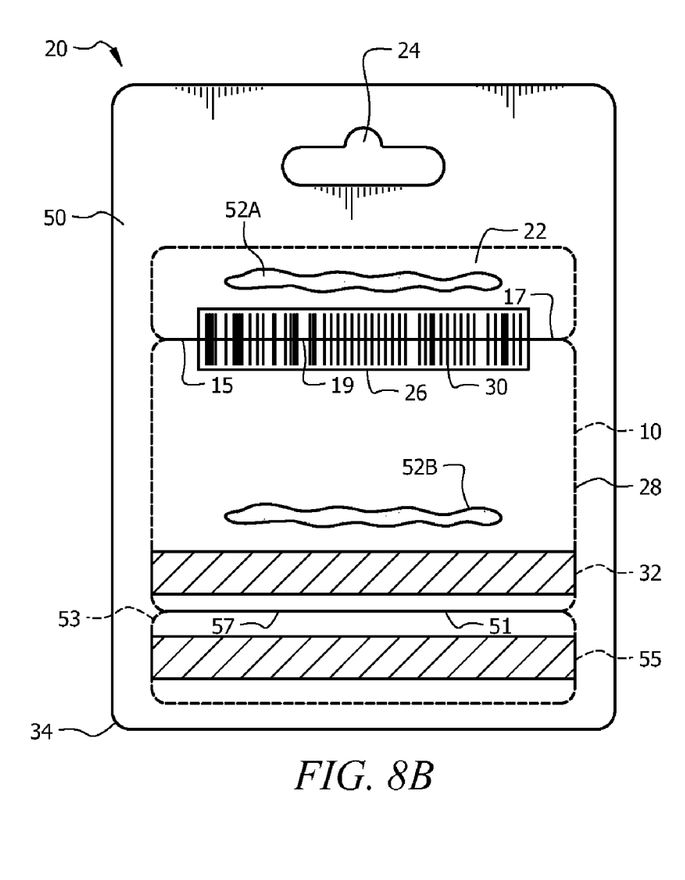

An eighth embodiment of a transaction card package assembly 20 is shown in the front view of FIG. 8A and the back view of FIG. 8B. The eighth embodiment comprises the seventh embodiment of FIG. 7 attached affixed on a rack hanger 50. The rack hanger 50 may comprise a panel (as shown), a folding card having two or more panels, an envelope having two or more panels, or combinations thereof. The panel 22 is attached to the rack hanger 50 by attachment means 52A such as adhesive, tacks, staples, rivets, or combinations thereof. The attachment means 52A holds the panel 22 firmly in contact with rack hanger 50 such that the transaction card 10 may be removed from the panel 22 and rack hanger 50, for example by snapping and breaking the interface 17 or tearing a perforated interface 17. Transaction card 10 may optionally be attached to the rack hanger 50 via a second attachment means 52B, as will be discussed in more detail below.

The rack hanger 50 further comprises an opening 24 and window 26. Opening 24 may be a "sombrero" shaped aperture or cut-out suitable for hanging the package assembly 20 from a rod in a display rack or shelf in a retail store. The window 26 may be an aperture or cut-out, or alternatively may be a transparent portion such as a cut-out covered by a clear film. In the back view shown in FIG. 8B, the position of card 10 and panel 22 is indicated by dashed line 28. As is shown in FIG. 8B, the panel 22 is positioned and attached via attachment means 52A to rack hanger 50 such that a bar code 30 located on the back of panel 22 is visible through window 26. In an embodiment, bar code 30 is an EAN/UCC-128 bar code containing both a vendor product identification portion and an issuer account portion encoded thereon.

In an alternative embodiment of FIG. 8, the rack hanger 50 may further comprise a bar code, for example an EAN/UCC-12 bar code, containing a vendor product identification code, such as bar code 18 shown in FIG. 4B. The bar code 18 may be located on the front of rack hanger 50 on the back of rack hanger 50, or both. In an embodiment, the bar code 18 is positioned on an upper portion 16 of the rack hanger 50, for example in an upper corner of rack hanger 50 adjacent the opening 24. Positioning the bar code 18 on the upper portion 16 of the rack hanger 50 distances the bar code 18 from other bar codes that may be present elsewhere on the package assembly (e.g., bar code 30), and may thereby aid in the scanning of the bar codes. The second panel 53 further comprises a magnetic stripe 55, which is accessible for swiping at a point of sale terminal. For example, a lower portion 34 of the rack hanger 50 may be folded back such that the magnetic stripe 55 may be swiped rough a magnetic stripe reader at the point of sale terminal. An optional second attachment means 52B may be disposed between the card 10 and the rack hanger 50 to aid in positioning of the card or to help prevent fraud by making the magnetic stripe 32 on card 10 inaccessible while allowing access to magnetic stripe 55 for activation at a point of sale. The card 10 may also have a magnetic stripe 32, wherein the magnetic stripe 55 on the second panel 53 contains an activation code to activate an issuer account contained within the magnetic stripe 32, as discussed previously. In addition to or in lieu of the magnetic stripe 32, the card 10 may have an issuer bar code 41, wherein the issuer bar code 41 and the magnetic stripe on the rack hanger 50 each contain the same issuer account code, which are activated via the activation code in magnetic stripe 55. The presence of bar code 18, bar code 30, and magnetic stripes 32 and 55 may result in a hybrid package assembly, as is described in more detail in U.S. patent application Ser. No. 11/380,838, which may be activated by either a one-step or two-step activation process.

The transaction card 10 may be folded and/or pulled forward away from the rack hanger 50, thereby snapping and breaking the interface 17 to remove the card from the package assembly 20. Alternatively, the transaction card 10 may be folded and/or pulled forward away from the rack hanger 50, thereby tearing the perforated interface 17 to remove the card from the package assembly 20. Upon removal of the card, the upper half of the snap and break or perforated connection, i.e., panel 22, remains affixed to the rack hanger 50. Likewise, lower panel 53 may be removed from the card before or after removal of the card from panel 22, for example via snapping and breaking along the interface 57. After activation of the transaction card 10 and removal of the card from the package assembly 20, the remainder of the package assembly may be discarded.

Package assembly embodiments as described herein may be manufactured according to various methods known in the art. For example, transaction cards and card holders can be manufactured and printed and subsequently placed in a printed rack hanger, or alternatively the transaction card and card holder can be made concurrently, for example via coextrusion of a plastic sheet with subsequent printing and placed in a printed rack hanger. Where made of a plastic or polymer, the type of material may be selected to provide appropriate functional characteristics such as printability, gloss, the ability to snap and break along a score, etc. In an embodiment, an existing transaction card 10 is retrofitted connecting the card 10 with panel 22 using a retaining means 15, and optionally subsequently attaching the card 10 and panel 22 to a rack hanger via attachment means 52. In some embodiment, security codes may be applied to prefabricated package assemblies via stickers spanning the transaction card and the card holder. Alternative methods of making the various embodiments disclosed herein will be apparent to those skilled in the art.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What we claim as our invention is:

1. A transaction card package assembly comprising:
a transaction card connected to a first panel via a releasable interface, wherein the first panel is affixed to a second panel such that upon releasing the interface, the first panel remains affixed to the second panel and the transaction card is released from the package assembly; and
a security code spanning the transaction card and a card holder such that upon removal of the transaction card from the card holder, the security code is broken and a portion of the security code is present on the transaction card and a portion of the security code is present on the card holder, wherein the broken security code provides a tactile indication of potentially fraudulent activity.

2. The package assembly of claim 1 wherein the interface is a snap and break interface.

3. The package assembly of claim 1 wherein the interface is a perforated interface.

4. The package assembly of claim 1 wherein the transaction card and the first panel comprise a molded sheet of plastic and the interface is a score or break line there between.

5. The package assembly of claim 1 wherein the transaction card and the first panel comprise a rigid paper or cardboard and the interface is a series of perforations there between.

6. The package assembly of claim 1 wherein the second panel is a rack hanger having an opening for receipt of a rack or shelf rod.

7. The package assembly of claim 1 wherein the width of the first panel is less than half the width of the transaction card.

8. The package assembly of claim 6 wherein the length and width of the rack hanger is greater than the length and width of the transaction card affixed to the first panel.

9. The package assembly of claim 6 further comprising a window such that information on the back of the transaction card, the first panel, or both is visible from the back of the rack hanger.

10. The package assembly of claim 9 wherein an EAN/UCC-128 bar code is located on the back of the first panel and is visible through the window.

11. The package assembly of claim 10 wherein the EAN/UCC-128 bar code spans the interface between the transaction card and the first panel, thereby providing the security code for the package assembly.

12. The package assembly of claim 11 wherein a numeric portion of the EAN/UCC-128 bar code spans the interface between the transaction card and the first panel, thereby providing the security code for the package assembly.

13. The package assembly of claim 1 further comprising at least three unique identifiers thereon such that the transaction card may be activated at a point of sale by either a one-step or two-step activation process.

14. The package assembly of claim 13 wherein at least one identifier is present on the transaction card or first panel and is visible through a window in the second panel.

15. The package assembly of claim 14 wherein the three unique identifiers comprise a vendor product identification code contained an EAN/UCC-12 bar code, an issuer account code contained in a magnetic stripe or an issuer bar code, and a combination vendor product identification and issuer account code contained in an EAN/UCC-128 bar code.

16. The package assembly of claim 1 wherein the first panel comprises an EAN/UCC-128 bar code and the transaction card comprises a magnetic stripe, an issuer bar code, or both.

17. The package assembly of claim 1 further comprising a third panel connected to the transaction card via a releasable interface.

18. The package assembly of claim 17 wherein the third panel further comprises a magnetic stripe.

19. The package assembly of claim 18 wherein the magnetic stripe on the third panel contains an activation code for activating an account associated with the transaction card, wherein the activation code is not the same as the account number.

20. The package assembly of claim 1 further comprising at least three unique identifiers thereon such that the transaction card may be activated at a point of sale by either a one-step or two-step activation process and wherein the interface is a snap and break interface.

21. The package assembly of claim 1 further comprising at least three unique identifiers thereon such that the transaction card may be activated at a point of sale by either a one-step or two-step activation process and wherein the interface is a perforated interface.

22. The package assembly of claim 1 wherein the transaction card and the first panel comprise a molded sheet of plastic and the interface is a score or break line there between and wherein the second panel is a rack hanger having an opening for receipt of a rack or shelf rod.

23. The package assembly of claim 1 wherein the transaction card and the first panel comprise a rigid paper or cardboard and the interface is a series of perforations there between and wherein the second panel is a rack hanger having an opening for receipt of a rack or shelf rod.

24. The package assembly of claim 1 further comprising at least three unique identifiers thereon such that the transaction card may be activated at a point of sale by either a one-step or two-step activation process, wherein at least one identifier is present on the transaction card or first panel and is visible through a window in the second panel, and wherein the interface is a snap and break interface.

25. The package assembly of claim 1 further comprising at least three unique identifiers thereon such that the transaction card may be activated at a point of sale by either a one-step or two-step activation process, wherein at least one identifier is present on the transaction card or first panel and is visible through a window in the second panel, and wherein the interface is a perforated interface.

26. The package assembly of claim 1 further comprising at least three unique identifiers thereon such that the transaction card may be activated at a point of sale by either a one-step or two-step activation process, wherein the three unique identifiers comprise a vendor product identification code contained an EAN/UCC-12 bar code, an issuer account code contained in a magnetic stripe or an issuer bar code, and a combination vendor product identification and issuer account code contained in an EAN/UCC-128 bar code, wherein at least one identifier is present on the transaction card or first panel and is visible through a window in the second panel, and wherein the interface is a snap and break interface.

27. The package assembly of claim 1 further comprising at least three unique identifiers thereon such that the transaction card may be activated at a point of sale by either a one-step or two-step activation process, wherein the three unique identifiers comprise a vendor product identification code contained an EAN/UCC-12 bar code, an issuer account code contained in a magnetic stripe or an issuer bar code, and a combination vendor product identification and issuer account code contained in an EAN/UCC-128 bar code, wherein at least one identifier is present on the transaction card or first panel and is visible through a window in the second panel, and wherein the interface is a perforated interface.

28. The package assembly of claim 1 further comprising a third panel connected to the transaction card via a releasable interface and wherein the first panel comprises an EAN/UCC-128 bar code and the transaction card comprises a magnetic stripe, an issuer bar code, or both.

29. The package assembly of claim 1 further comprising a third panel connected to the transaction card via a releasable interface, wherein the first panel comprises an EAN/UCC-128 bar code and the transaction card comprises a magnetic stripe, an issuer bar code, or both, wherein the third panel further comprises a magnetic stripe, wherein the magnetic stripe on the third panel contains an activation code for activating an account associated with the transaction card, and wherein the activation code is not the same as the account number.

30. A transaction card package assembly comprising:
a transaction card connected to a first panel via a releasable interface, wherein the first panel is affixed to a second panel such that upon releasing the interface, the first panel remains affixed to the second panel and the transaction card is released from the package assembly;

at least three unique identifiers thereon such that the transaction card may be activated at a point of sale by either a one-step or two-step activation process, wherein at least one identifier is present on the transaction card or first panel and is visible through a window in the second panel, and wherein the three unique identifiers comprise a vendor product identification code contained an EAN/UCC-12 bar code, an issuer account code contained in a magnetic stripe or an issuer bar code, and a combination vendor product identification and issuer account code contained in an EAN/UCC-128 bar code.

31. The package assembly of claim 30 wherein the interface is a snap and break interface.

32. The package assembly of claim 30 wherein the interface is a perforated interface.

33. The package assembly of claim 30 wherein the transaction card and the first panel comprise a molded sheet of plastic and the interface is a score or break line there between.

34. The package assembly of claim 30 wherein the transaction card and the first panel comprise a rigid paper or cardboard and the interface is a series of perforations there between.

35. The package assembly of claim 30 wherein the second panel is a rack hanger having an opening for receipt of a rack or shelf rod.

36. The package assembly of claim 30 wherein the width of the first panel is less than half the width of the transaction card.

37. The package assembly of claim 35 wherein the length and width of a rack hanger is greater than a length and width of the transaction card affixed to the first panel.

38. The package assembly of claim 30 further comprising a third panel connected to the transaction card via a releasable interface.

39. The package assembly of claim 38 wherein the third panel further comprises a magnetic stripe.

40. The package assembly of claim 39 wherein the magnetic stripe on the third panel contains an activation code for activating an account associated with the transaction card, wherein the activation code is not the same as the account number.

41. The package assembly of claim 30 further comprising a third panel connected to the transaction card via a releasable interface and wherein the interface is a snap and break interface.

42. The package assembly of claim 30 further comprising a third panel connected to the transaction card via a releasable interface and wherein the interface is a perforated interface.

43. The package assembly of claim 30 further comprising a third panel connected to the transaction card via a releasable interface, wherein the interface is a snap and break interface, and wherein the second panel is a rack hanger having an opening for receipt of a rack or shelf rod.

44. The package assembly of claim 30 further comprising a third panel connected to the transaction card via a releasable interface, wherein the interface is a perforated interface, and wherein the second panel is a rack hanger having an opening for receipt of a rack or shelf rod.

45. The package assembly of claim 30 further comprising a third panel connected to the transaction card via a releasable interface wherein the transaction card and wherein the transaction card and first panel comprise a molded sheet of plastic and the interface is a score or break line there between.

46. A transaction card package assembly comprising:
 a transaction card connected to a first panel via a releasable interface, wherein the first panel is affixed to a second panel such that upon releasing the interface, the first panel remains affixed to the second panel and the transaction card is released from the package assembly;
 a third panel connected to the transaction card via a releasable interface, wherein the second panel is a rack hanger having an opening for receipt of a rack or shelf rod; and
 a window such that information on the back of the transaction card, the first panel, or both is visible from the back of the rack hanger.

47. The package assembly of claim 46 wherein an EAN/UCC-128 bar code is located on the back of the first panel and is visible through the window.

48. The package assembly of claim 47 wherein the EAN/UCC-128 bar code spans the interface between the transaction card and the first panel, thereby providing the security code for the package assembly.

49. The package assembly of claim 48 wherein a numeric portion of the EAN/UCC-128 bar code spans the interface between the transaction card and the first panel, thereby providing the security code for the package assembly.

50. The package assembly of claim 48 wherein the security code is a unique sequence of letters, numbers, characters, symbols, pictures, designs, graphics, or combinations thereof.

51. The package assembly of claim 48 wherein a broken security code provides a visual indication of potentially fraudulent activity.

* * * * *

UNITED STATES PATENT AND TRADEMARK OFFICE
CERTIFICATE OF CORRECTION

| | | |
|---|---|---|
| PATENT NO. | : 7,753,262 B2 | Page 1 of 1 |
| APPLICATION NO. | : 11/380888 | |
| DATED | : July 13, 2010 | |
| INVENTOR(S) | : Donald Kingsborough et al. | |

It is certified that error appears in the above-identified patent and that said Letters Patent is hereby corrected as shown below:

Column 5, Line 66, replace "In such a: hybrid" with -- In such a hybrid --

Column 6, Line 16, replace "or both (as shown) my contain" with -- or both (as shown) may contain --

Column 7, Line 1, replace "may be less tan, equal to," with -- may be less than, equal to, --

Column 7, Line 13, replace "may Farther comprise" with -- may further comprise --

Column 8, Line 12, replace "may contain may contain an" with -- may contain an --

Signed and Sealed this

Fifth Day of October, 2010

David J. Kappos
*Director of the United States Patent and Trademark Office*